US012559957B2

(12) United States Patent
Moose

(10) Patent No.: US 12,559,957 B2
(45) Date of Patent: Feb. 24, 2026

(54) ANCHOR DEVICE FOR ATTACHING LINE TO EXPOSED REINFORCING BAR AT A CONSTRUCTION SITE AND RELATED METHOD

(71) Applicant: MOOSE PRINT INC., Edmonton (CA)

(72) Inventor: Darcy Roy Moose, Winnipeg (CA)

(73) Assignee: Darcy Roy Moose, Winnipeg (CA)

( * ) Notice: Subject to any disclaimer, the term of this patent is extended or adjusted under 35 U.S.C. 154(b) by 1108 days.

(21) Appl. No.: 17/608,865

(22) PCT Filed: Jun. 12, 2020

(86) PCT No.: PCT/CA2020/050816
§ 371 (c)(1),
(2) Date: Nov. 4, 2021

(87) PCT Pub. No.: WO2020/248070
PCT Pub. Date: Dec. 17, 2020

(65) Prior Publication Data

US 2022/0298814 A1 Sep. 22, 2022

Related U.S. Application Data

(60) Provisional application No. 62/899,199, filed on Sep. 12, 2019, provisional application No. 62/860,330, filed on Jun. 12, 2019.

(51) Int. Cl.
*A62B 35/00* (2006.01)
*E04G 21/32* (2006.01)

(52) U.S. Cl.
CPC ...... *E04G 21/3276* (2013.01); *A62B 35/0068* (2013.01)

(58) Field of Classification Search
CPC .. A62B 35/068; E04G 21/185; E04G 21/3276
See application file for complete search history.

(56) References Cited

U.S. PATENT DOCUMENTS 4,143,446 A 3/1979 Down
2002/0053485 A1* 5/2002 Reynolds ........... A62B 35/0056 256/32

(Continued)

FOREIGN PATENT DOCUMENTS

KR 20090007267 U * 7/2009
KR 101525762 B1 6/2015

OTHER PUBLICATIONS

Machine translation KR20090007267 (Year: 2009).*

*Primary Examiner* — Abe Massad
*Assistant Examiner* — Jeremy C Ramsey
(74) *Attorney, Agent, or Firm* — Adrian D. Battison; Ade & Company Inc.; Ryan W. Dupuis

(57) ABSTRACT

A device for attaching to exposed ribbed reinforcing bar at a construction site to form an anchor for a safety line comprises a tubular body defining a substantially cylindrical interior cavity diametrically sized and shaped in a manner substantially corresponding to a length of the reinforcing bar so that the interior cavity can be snugly received over the length of the reinforcing bar. The device includes an attachment location defined on the tubular body for connecting the safety line and features a plurality of grooves defined at the interior cavity and arranged to matably receive ribs of the reinforcing bar so as to secure the device in fixed location along the reinforcing bar. During construction of a structure, the device is used to support a worker against falling and thereafter may be left attached to the reinforcing bar and subsequently a remainder of the structure may be cast in concrete.

2 Claims, 4 Drawing Sheets

(56) References Cited

U.S. PATENT DOCUMENTS

| | | | | |
|---|---|---|---|---|
| 2016/0102469 | A1* | 4/2016 | Borchardt | F16M 13/02 52/741.1 |
| 2019/0330867 | A1* | 10/2019 | Walsh | E04G 21/3219 |
| 2021/0108429 | A1* | 4/2021 | Walsh | E04G 21/3276 |
| 2023/0203812 | A1* | 6/2023 | Lomax | B25B 5/101 52/719 |

* cited by examiner

ANCHOR DEVICE FOR ATTACHING LINE TO EXPOSED REINFORCING BAR AT A CONSTRUCTION SITE AND RELATED METHOD

This application is a national phase filing of PCT/CA2020/050816 and claims priority from U.S. Provisional Application Ser. No. 62/860,330 filed Jun. 12, 2019 and U.S. Provisional Application Ser. No. 62/899,199 filed Sep. 12, 2019.

FIELD OF THE INVENTION

The present invention relates generally to a fall arrest/protection device usable at a construction site to prevent a user from falling, and more particularly to such a device which attaches to reinforcing bar.

BACKGROUND

Fall protection is an important aspect of worker safety in the construction industry. Novel devices for protecting workers against falling during construction of upstanding concrete structures which are formed from concrete and embedded reinforcing bar are desirable.

SUMMARY OF THE INVENTION

According to an aspect of the invention there is provided a device for attaching to exposed ribbed reinforcing bar at a construction site to form an anchor for a safety line comprising:

- a tubular body extending from a first open end to a second end and defining there between a substantially cylindrical interior cavity communicated with an exterior of the body at the first open end and diametrically sized and shaped in a manner substantially corresponding to a length of the reinforcing bar so that the interior cavity can be snugly received over the length of the reinforcing bar passing through the first open end and into the cavity;
- an attachment location defined on the tubular body for connecting the safety line; and
- a plurality of grooves defined at the interior cavity and arranged to matably receive ribs of the reinforcing bar so as to secure the device in fixed location along the reinforcing bar.

This provides a relative simple arrangement for providing a fixed anchor point to support a worker during construction work.

In the illustrated arrangement, the tubular body comprises a plurality of separate portions each extending from a first angular location relative to an axis of the tubular body to a second angular location relative thereto and defining a portion of the interior cavity, the separate portions being movable relative to each other so as to provide a cavity-forming condition in which the separate portions collectively form the interior cavity around the reinforcing bar.

In the illustrated arrangement, the separate portions include a first portion and a second portion which are hingedly interconnected about a pivot axis which is substantially parallel to the axis of the tubular body to be movable between an open position in which distal sides of the first and second portions relative to the pivot axis are in spaced relation to one another and a closed position in which the distal sides are brought to touch and the first and second portions are secured to one another so as to provide the cavity-forming condition.

In the illustrated arrangement, the grooves comprise a first set of parallel grooves and a second set of parallel grooves which are transversely oriented to the first set of parallel grooves so as to form a plurality of pairs of intersecting grooves.

According to another aspect of the invention there is provided a method of constructing an upstanding structure comprising concrete and reinforcing bar, the method comprising:

- attaching an anchor for supporting a worker during construction work to exposed reinforcing bar which is fixedly supported;
- after a safety line is attached to the anchor and the anchor is attached to the reinforcing bar, attaching the worker to the safety line so that the worker is supported thereby for subsequently performing the construction work;
- after completion of the construction work, releasing the worker from the safety line; and
- embedding the reinforcing bar with the anchor attached thereto in concrete so as to form the upstanding structure.

Preferably, the method includes releasing the safety line from the anchor after completion of the construction.

BRIEF DESCRIPTION OF THE DRAWINGS

The invention will now be described in conjunction with the accompanying drawings in which.

In the drawings, like characters of reference indicate corresponding parts in the different figures.

DETAILED DESCRIPTION

Figure 3:
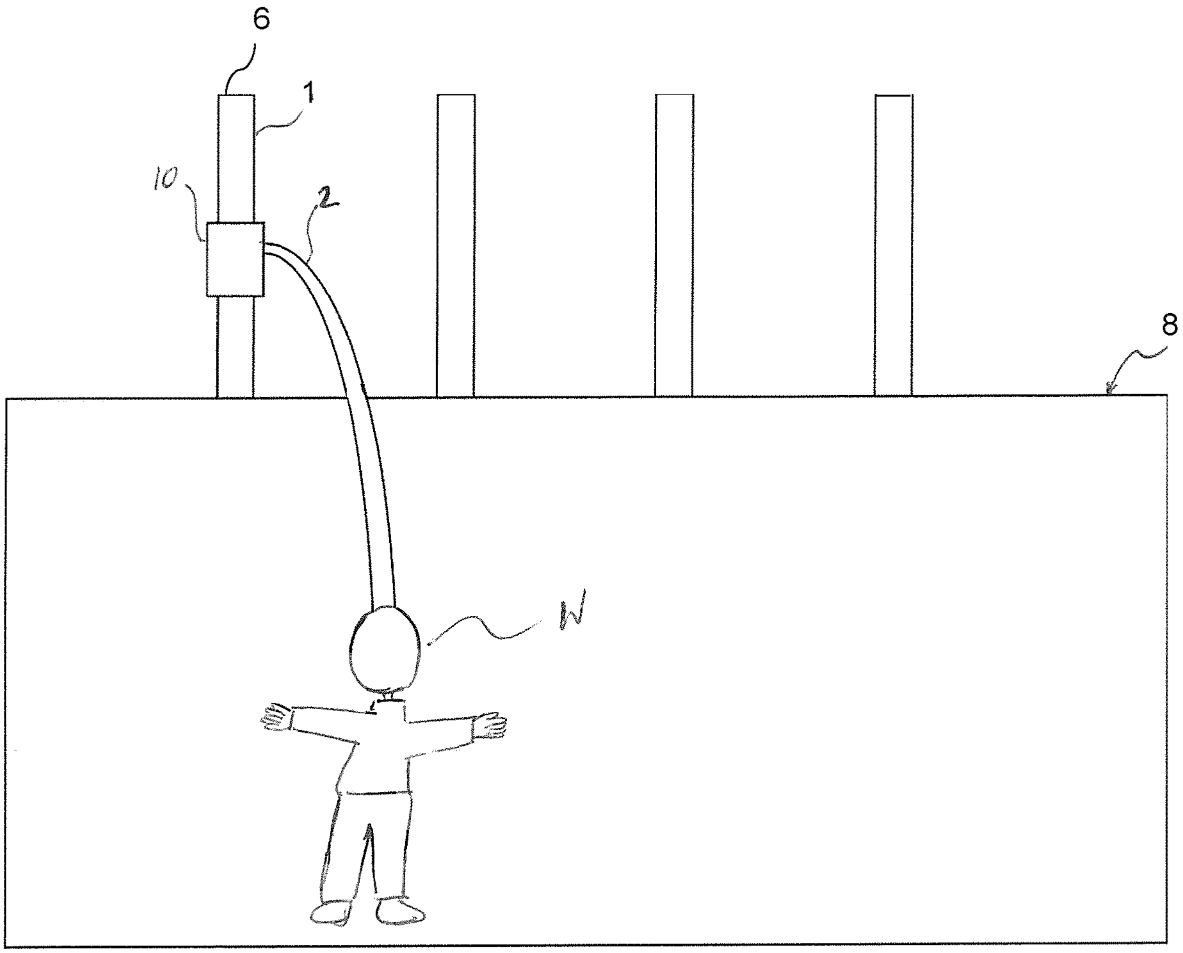
FIG. 3 is a schematic illustration of the device of FIG. 1 in use with some components omitted for convenience of illustration.

There is schematically shown in the accompanying figures a device 10 for attaching to exposed ribbed reinforcing bar 1 at a construction site to form an anchor for a safety line 2 (FIG. 3).

Reinforcing bar, which in industry is commonly known as rebar, comes in different length but is generally of uniform cross-sectional size and shape along its full length. The device 10 described herein is preferably suited for use with reinforcing bar having a bar number 20M, 25M, 30M or 35M as is known in the art and represented by the following table.

| Bar Number | Mass (kg/m) | Nominal Diameter (mm) | Cross Sectional Area ($mm^2$) |
|---|---|---|---|
| 10M | 0.785 | 11.3 | 100 |
| 15M | 1.570 | 16.0 | 200 |
| 20M | 2.355 | 19.5 | 300 |
| 25M | 3.925 | 25.2 | 500 |
| 30M | 5.495 | 29.9 | 700 |
| 35M | 7.850 | 35.7 | 1000 |

-continued

| Bar Number | Mass (kg/m) | Nominal Diameter (mm) | Cross Sectional Area ($mm^2$) |
|---|---|---|---|
| 45M | 11.775 | 43.7 | 1500 |
| 55M | 19.625 | 56.4 | 2500 |

Ribbed reinforcing bar comprises a main shaft 3 and a plurality of ribs 4 protruding outwardly from an outer surface 5 of the shaft. Each rib 4 is located at a longitudinally spaced location from the other along the shaft and extends circumferentially of the bar, which is normally circular in cross-sectional shape, so as to be oriented transversely to a longitudinal direction of the bar along which it is elongated. The ribs 4 may also extend longitudinally of the shaft so that they are inclined relative to the longitudinal direction of the shaft.

Figure 1:
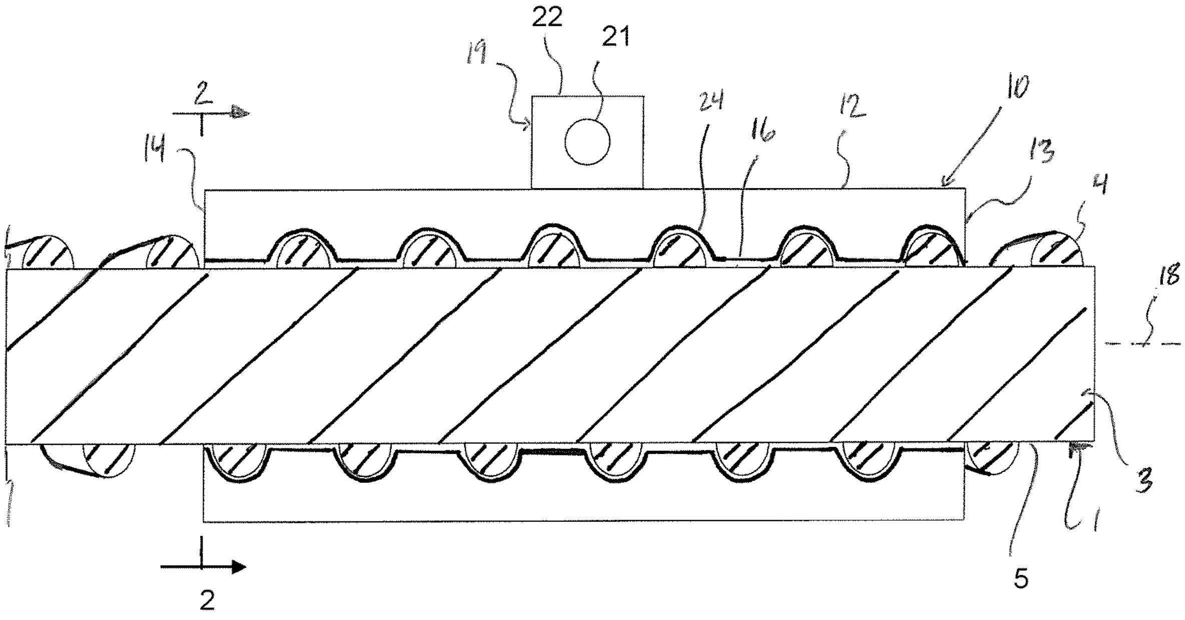
FIG. 1 is a longitudinal-sectional view of a device according to an arrangement of the present invention.

Referring to FIG. 1, the device 10 comprises a tubular body 12 extending from a first open end 13 to a second end 14. The body 12 defines between the ends 13, 14 a substantially cylindrical interior cavity 16 communicated with an exterior of the body at the open end 13 and diametrically sized and shaped in a manner substantially corresponding to a length of the reinforcing bar 1 so that the interior cavity 16 can be snugly received over the length of the reinforcing bar passing through the open end 13 and into the cavity. In the illustrated arrangement, the body 12 extends axially along axis 18 between its opposite ends 13, 14, which typically is linear as shown in FIG. 1 so that the body 12 is receivable over a linearly extending length of the reinforcing bar. Also, in the illustrated arrangement, both of the ends 13, 14 of the body are open such that the cavity 16 acts as a passageway therebetween and the body can be positioned at an intermediary location on the rebar spaced from its terminus 6.

An attachment location 19 is defined on the tubular body 12 externally of the cavity 16 for connecting the safety line 3 to the device 10. In the illustrated arrangement, the attachment location 19 is provided by an aperture 21 defined by an upstanding tab 22 connected to the tubular body 12 suited to receive a length of safety line therethrough or a removably attachable clip secured to the safety line.

Additionally, the device 10 includes a plurality of grooves 24 defined at the interior cavity 16 that are arranged to matably receive the ribs 4 of the reinforcing bar so as to secure the device in fixed location along the reinforcing bar. That is, the grooves 24 define recesses which are communicated with the cavity 16 and are sized and shaped to substantially correspond to the ribs 4 of the rebar so as to snugly receive the same when the tubular body 12 is received over the rebar. Basically, the grooves 24 mesh with the ribs 4 to resist longitudinal movement of the device when the body 12 is attached to the rebar. When the ribs 4 are separate from one another, so as to be disconnected and not to form a continuous, for example helical, thread about the shaft 2, the intermeshing of the grooves 24 and the ribs 4 also maintains the device in fixed angular relation about the rebar so as to prevent the device from rotating around the rebar.

Figure 2:
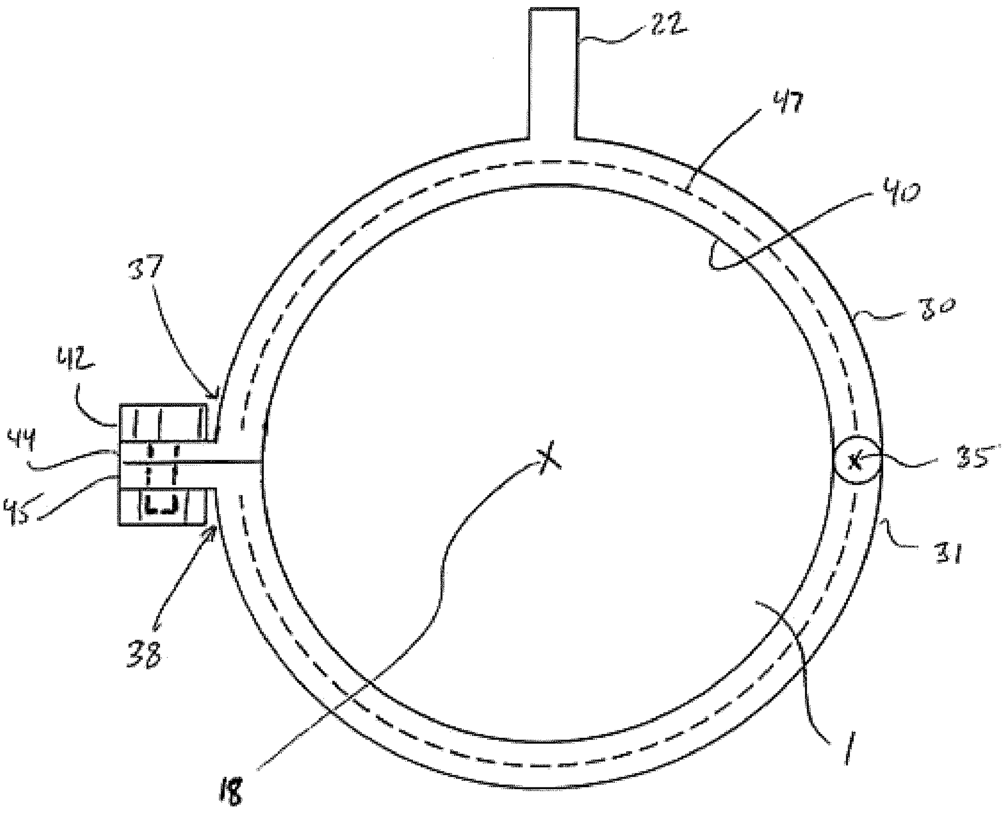
FIG. 2 is a cross-sectional view taken along line 2-2 in FIG. 1.

In order to locate the body 12 over the rebar when it is arranged to snugly receive same, the tubular body 12 comprises a plurality of separate portions such as first and second portions 30, 31 each extending from a first angular location relative to an axis 18 of the tubular body to a second spaced angular location relative thereto and defining a portion of the interior cavity 16. The separate portions 30, 31 are movable relative to each other so as to provide a cavity-forming condition as shown in FIG. 2 in which the separate portions collectively form the interior cavity 16 around the reinforcing bar 1. Thus the body 12 can be attached to the intermediary location along the rebar without passing the body over the terminal end 6 of the rebar in order to arrange it at the intermediary location.

For convenient attachment to the rebar, the first and second portions 30, 31 are hingedly interconnected about a pivot axis 35 which is substantially parallel to the axis 18 of the tubular body to be movable between an open position in which distal sides 37, 38 of the first and second portions, relative to the pivot axis 35, are in spaced relation to one another and a closed position in which the distal sides 37, 38 are brought to touch and the first and second portions are secured to one another so as to provide the cavity-forming condition of FIG. 2. In the open position, the distal sides 37, 38 of the portions are spaced apart by a distance sufficient to arrange an inner surface 40 of one of the two portions 30, 31 generally in engagement with the rebar. In the closed position, the separate portions 30, 31 collectively substantially encompass the rebar. The two portions 30, 31 can be secured together in the closed position by a fastener 42 passing through registered apertures formed in flanges 44, 45 at the distal sides 37, 38 of the portions lying parallel to the tubular body 12.

In FIG. 2, the stippled line indicated at 47 indicates a location of bases of the grooves 24 relative to the interior cavity 16 defined by inner surfaces 40 showing that they are recessed relative thereto in a radially outward direction from axis 18. In use the body 12 is located substantially coaxially of the reinforcing bar 1.

The tubular body 12 is made from stainless steel or forged steel so as to provide suitable strength and durability. The body 12 is sized so as not be much larger in outer diameter than an outer diameter of the rebar measured between diametrically opposite locations of the rebar ribs 4.

In use of the device 10 when constructing an upstanding structure 8 as shown in FIG. 3 comprising concrete and reinforcing bar 1, such as a wall of a building or a dam, before a worker W commences any work as part of the construction of the structure, the anchor 10 is attached to the exposed reinforcing bar 1 which is fixedly supported. The exposed reinforcing bar 1, which is not covered by any concrete, may be fixedly supported because another length of same is already embedded in cured concrete. Also, the safety line 2 is attached to the anchor, before or after the anchor is attached to the rebar.

The worker W may then attach themselves to the safety line 2 that is attached to the anchor which is in turn attached to the reinforcing bar 1, and be supported against falling to a height exceeding a length of the safety line supported by the anchor device 10 such that the worker W can proceed to perform their construction work.

After completion of the construction work, the worker W releases themselves from the safety line 2 so as to be detached therefrom. At this time the safety line 2 also may be released from the anchor 10.

Thereafter, the anchor 10 may be left attached to the reinforcing bar 1 and same may be embedded in concrete so as to form the upstanding structure.

This provides a relative simple arrangement for providing a fixed anchor point to support a worker during construction work. After use to support a worker the device may remain attached to the reinforcing bar and the remainder of the structure may be cast in concrete to embed that length of reinforcing bar without the device substantially affecting structural integrity of the formed structure.

Figure 4:
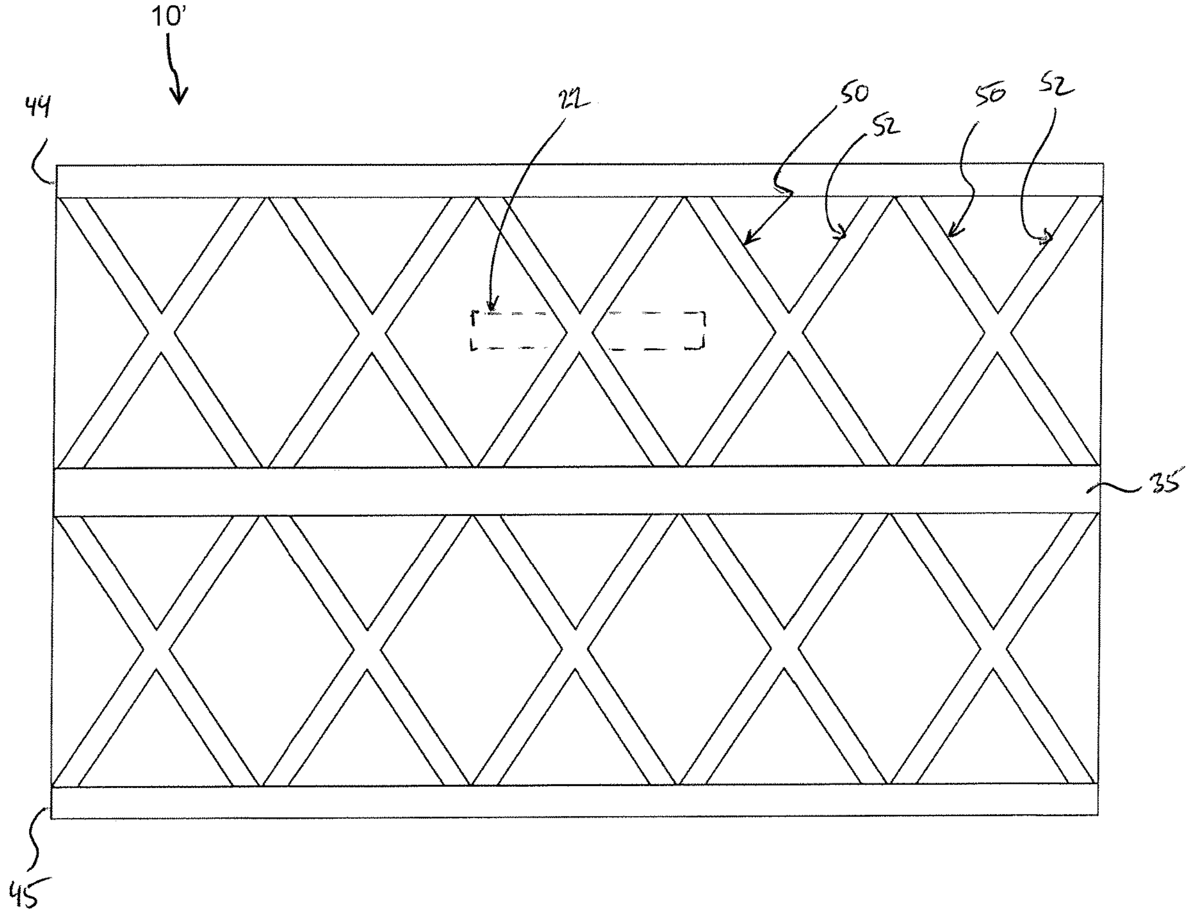
FIG. 4 is a plan view of an inside of a second arrangement of device according to the present invention shown in an open position.

FIG. 4 shows a second arrangement of the device indicated at 10' having a first set of parallel grooves 50 and a second set of parallel grooves 52 which are transversely oriented to the first set of grooves so as to form a plurality of pairs of intersecting grooves each in the form an X enabling the device 10' to be mounted on the reinforcing bar in either one of two directions. The two sets of grooves 50, 52 are symmetrical about an axial plane. Where there is only one set of parallel grooves provided, then at any given location along the reinforcing bar there is a single orientation of the device thereto which is predetermined by the ribs 4 of the reinforcing bar; however, when the intersecting pairs of grooves 50, 52 are provided, there are two orientations of the device at any one longitudinal location of the reinforcing bar thereby providing two diametrically opposite locations of the attachment location 19. The attachment location defined by the tab 22 is shown in stippled line as it is located on the outer side of the device 10' and is otherwise not visible FIG. 4.

The scope of the claims should not be limited by the preferred embodiments set forth in the examples but should be given the broadest interpretation consistent with the specification as a whole.

The invention claimed is:

1. A method of constructing an upstanding structure comprising concrete and a plurality of reinforcing bars, the method comprising:

forming an assembly of the plurality of reinforcing bars;

casting concrete around some parts of the plurality of reinforcing bars leaving other parts of the plurality of reinforcing bars exposed from the concrete;

attaching an anchor for supporting a worker during construction work to a selected one of the parts of exposed reinforcing bars which is fixedly supported;

the anchor comprising:

a tubular body extending from a first open end to a second end and defining therebetween a substantially cylindrical interior cavity diametrically sized and shaped in a manner substantially corresponding to a length of the reinforcing bar so that the interior cavity can be received over the length of the reinforcing bar;

the tubular body including a first portion and a second portion which are hingedly interconnected about a pivot axis which is substantially parallel to a longitudinal axis of the tubular body to be movable between an open position in which distal sides of the first and second portions relative to the pivot axis are in spaced relation to one another and a closed position in which the distal sides are brought together and the first and second portions are secured to one another so as to provide the substantially cylindrical interior cavity; and an attachment loop formed on the tubular body for connecting to a safety line;

with the part of the reinforcing bar being exposed, attaching the tubular body around the length of the selected exposed reinforcing bar at an intermediary location along the exposed reinforcing bar spaced from a terminal end of the exposed reinforcing bar so that the longitudinal axis of the tubular body extends along the exposed reinforcing bar;

with the part of the reinforcing bar being exposed, attaching the safety line is attached to the attachment loop on the tubular body;

attaching the worker to the safety line so that the worker is supported thereby for subsequently performing the construction work on the upstanding structure;

after completion of the construction work, releasing the worker from the safety line; and embedding the part of the reinforcing bar with the anchor attached thereto in concrete so as to form the upstanding structure.

2. A method of constructing an upstanding structure comprising concrete and a plurality of reinforcing bars, the method comprising:

forming an assembly of the plurality of reinforcing bars;

casting concrete around some parts of the plurality of reinforcing bars leaving other parts of the plurality of reinforcing bars exposed from the concrete;

attaching an anchor for supporting a worker during construction work to a selected one of the parts of exposed reinforcing bars which is fixedly supported;

the anchor comprising:

a tubular body extending from a first open end to a second end and defining therebetween a substantially cylindrical interior cavity diametrically sized and shaped in a manner substantially corresponding to a length of the reinforcing bar so that the interior cavity can be received over the length of the reinforcing bar;

the tubular body including a first portion and a second portion which are hingedly interconnected about a pivot axis which is substantially parallel to a longitudinal axis of the tubular body to be movable between an open position in which distal sides of the first and second portions relative to the pivot axis are in spaced relation to one another and a closed position in which the distal sides are brought together and the first and second portions are secured to one another so as to provide the substantially cylindrical interior cavity;

a plurality of grooves defined on each of the first and second portions at the interior cavity and arranged to matably receive ribs of the exposed reinforcing bar so as to secure the device in fixed location along the exposed reinforcing bar, the grooves comprise a first set of parallel grooves inclined to the longitudinal axis at a first angle and a second set of parallel grooves inclined to the first set of parallel grooves so as to form a plurality of pairs of intersecting grooves;

and an attachment loop formed on the tubular body for connecting to a safety line;

with the part of the reinforcing bar being exposed, attaching the tubular body around the length of the selected exposed reinforcing bar at an intermediary location along the exposed reinforcing bar spaced from a terminal end of the exposed reinforcing bar so that the longitudinal axis of the tubular body extends along the exposed reinforcing bar;

with the part of the reinforcing bar being exposed, attaching the safety line to the attachment loop on the tubular body;

attaching the worker to the safety line so that the worker is supported thereby for subsequently performing construction work on the upstanding structure;

after completion of the construction work, releasing the worker from the safety line; and embedding the reinforcing bar with the anchor attached thereto in concrete so as to form the upstanding structure.

* * * * *